Dec. 1, 1970   W. C. TOOKER   3,544,175
FLEXURAL PIVOT HAVING LIMITED BENDING STRESSES
IMPARTED TO FLEXURE MEMBER
Filed Dec. 30, 1968   2 Sheets-Sheet 1

Walter C. Tooker
INVENTOR.

BY William B. Leach

ATTORNEY

Dec. 1, 1970   W. C. TOOKER   3,544,175
FLEXURAL PIVOT HAVING LIMITED BENDING STRESSES
IMPARTED TO FLEXURE MEMBER
Filed Dec. 30, 1968   2 Sheets-Sheet 2

Walter C. Tooker
INVENTOR.

BY William B. Leach
ATTORNEY

United States Patent Office 3,544,175
Patented Dec. 1, 1970

3,544,175
FLEXURAL PIVOT HAVING LIMITED BENDING STRESSES IMPARTED TO FLEXURE MEMBER
Walter C. Tooker, Palos Verdes Estates, Calif., assignor to TRW Inc., Redondo Beach, Calif., a corporation of Ohio
Filed Dec. 30, 1968, Ser. No. 787,828
Int. Cl. F16d 3/64
U.S. Cl. 308—2  6 Claims

ABSTRACT OF THE DISCLOSURE

Means for providing relatively rotational movement between two objects without the need for a bearing surface is provided. For example, an optical element may be mounted to perform a scanning operation. The flexural pivot includes a shaft member inserted within and spaced radially from an outer sleeve member. The shaft and outer sleeve are rotatable with respect to one another. The shaft is characterized by a diametrical slot into which is inserted a cam and spring-follower unit. This unit securely joins one end of the spring to the shaft member. The spring extends through the slot in the shaft to join with the sleeve member. The cam surfaces restrict the spring-follower to a prescribed bending shape thereby reducing the stresses in the spring.

BACKGROUND OF THE INVENTION

This invention relates generally to mechanical pivot joints and more specifically to flexural pivots of the type that do not have bearing surfaces.

In electronic and optical systems it is a common requirement that an element of the system be moved back and forth between two points. In other words, an oscillatory motion is required. Many bearing type pivot points are available to accomplish such a motion. When such systems are utilized for space missions, certain problems and limitations are introduced which render common pivot joints non useful. For example, extreme temperature changes in space may impose severe performance specifications on lubrication materials. The phenomena of cold welding of materials is another problem that must be avoided. Pivot joints which have sliding parts, such as a bushing, are potentially subject to the cold welding process. Flexure pivots have been designed which overcome these problems. One such design includes at least two cylinders adjacent one another and having a substantially common axis. Further included is a pair of flat crossed springs each extending from the interior of one cylinder to the interior of the other cylinder and interconnecting the two cylinders. The flat crossed springs provide a rotational axis at the intersection of said springs. An element to be rotated or oscillated is mounted on one of the cylinders and the other cylinder is mounted to a support structure.

The prior art flexural pivots of the foregoing description are adequate and successful for many but not all applications. One of the limiting factors to which the prior art devices are subject is the number of cycles through which the devices may be operated. For example, when subjected to substantially full deflection and a large number of cycles the flat springs tend to fail near their junction with the mounting cylinders. It is desirable to have a flexural pivot which may be continuously oscillated over a period of time exceeding five years and at an oscillation rate of five or more cycles per second.

It is accordingly an object of the present invention to provide a flexural pivot which may be continuously flexed over a long life cycle.

Another object of the present invention is to provide a flexural pivot having flat springs interconnecting the pivotal members wherein fatigue failure of the springs is substantially reduced.

A further object of the present invention is to provide a flexural pivot having a flat spring interconnecting the pivotal element and having cam surfaces which restrict the shape which the flat springs may assume in bending.

SUMMARY OF THE INVENTION

A flexural pivot suitable for mounting light weight electronic and optical elements for pivotal movement thereof is provided. A sleeve element encompasses an inner member in radially spaced arrangement. A flat spring is provided having one end attached to said sleeve element and the other end to said inner member. The flexible characteristics of the spring permit the sleeve element and the inner member to be rotated with respect to one another. Cam surfaces are provided adjacent the flat spring which serve to define the shape which the flat spring may assume when placed in flexure. The distribution of bending stresses in the flat spring may thereby be controlled. Bending of the spring at its junction with the sleeve element or the inner element may be substantially eliminated.

A number of flat springs may be spaced along and interconnecting the sleeve and inner element. Either the inner element or the sleeve member may be mounted to a support surface. The other member may serve as a mounting structure for an object such as an optical mirror.

The foregoing and other objects of the present invention will become more and better understood when taken in conjunction with the following description and accompanying drawings, throughout which like characters indicate like parts and which drawings form a part of this application.

DESCRIPTION OF THE PREFERRED EMBODIMENTS

Figure 1:
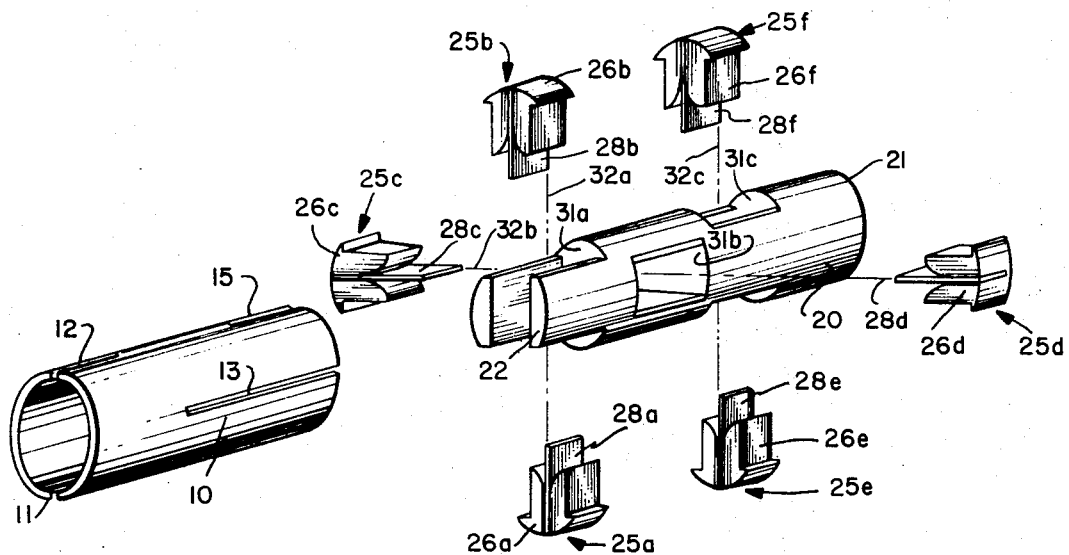
FIG. 1 is an exploded view in perspective showing the general arrangement of the parts forming the flexural pivot embodying the present invention.
Figure 2:
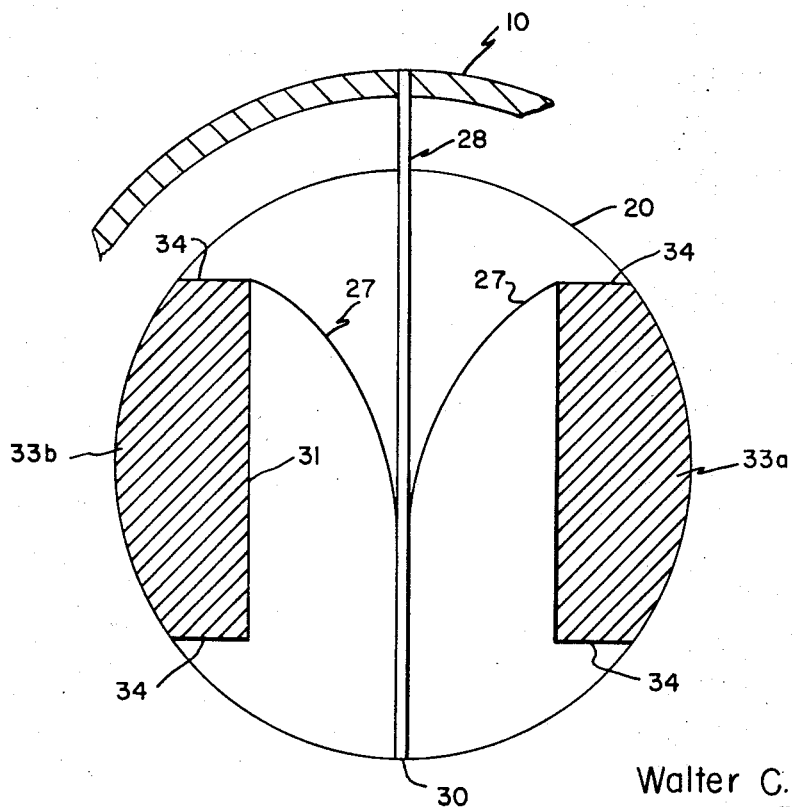
FIG. 2 is a view in cross section of one of the cam and spring-follower units shown in FIG. 1.

Referring now to the drawings and particularly to FIGS. 1 and 2 there is illustrated a flexural pivot embodying the present invention. This flexural pivot has the purpose of permitting rotational motion between an inner and outer member interconnected by flat springs while maintaining the bending stresses of the springs at a minimum. Accordingly, there is illustrated a sleeve member or element 10 which preferably takes the form of a hollow or tubular cylinder. The cylindrical sleeve 10 has formed therein diametrically opposed longitudinal slots 11, 12, the purpose of which will be explained below. The cylindrical sleeve 10 further includes two more pair of diametrically opposed longitudinal slots. Visable in FIG. 1 is one slot 13 of one pair and one slot 15 of the other pair of longitudinal slots.

The flexural pivot further includes an inner member 20 which may be generally rod or shaft like in shape. Inner member 20 extends within and entirely along the length of sleeve element 10 and further is radically spaced therefrom. The radical spacing is desirable to eliminate any friction or other form of interface between inner member 20 and sleeve element 10. Inner member 20 is of sufficient length such that one end 21 resides outside sleeve element 10. End portion 21 of inner member 20 may serve for attachment to a support surface while an object to be rotationally pivoted may be mounted on sleeve element 10. In a similar manner, the other end portion 22 of inner member 20 may extend outside of sleeve element 10 for attachment to a support surface. Of course, as the sleeve element 10 may be mounted to a fixed surface and an object or objects to be rotationally pivoted may be mounted on one or both of the end portions 21, 22 of inner member 20.

The flexural pivot is completed by the inclusion of at least one, and preferably a plurality of, spring-follower and cam units for interconnecting the inner member 20 and the sleeve element 10. A plurality of these interconnect units 25a–25f are shown in FIG. 1. In FIG. 2, one of these interconnect units is shown in assembled relationship to inner member 20 and sleeve element 10. Each of the interconnect units includes a body 26 having an elongated slot with contoured sides 27. Each interconnect unit further includes a flat rectangular spring 28 having one end edge 30 secured within the elongated slot of body 26.

As earlier indicated each interconnect unit serves to tie together the inner member 20 and sleeve element 10 into an integral unit while permitting rotational pivotal motion between member 20 and element 10. For this purpose, and as shown in FIG. 1, inner member 20 has passageways or diametrical slots 31a, 31b, 31c formed therein which are sized and shaped for receiving the interconnect unit 25 therein. For purposes of clarity, in FIG. 1, imaginary lines 32a, 32b, 32c are provided for showing the manner in which the various parts are assembled. As implied by the drawings, it is preferable that the interconnect units be utilized in pairs. As a matter of convenience, each pair of interconnect units share one of the diametrical passageways or slots of inner member 20. For example, interconnect units 25a, 25b form a pair and are inserted in opposite directions in juxaposition in slot 31a of inner member 20. As is obvious from FIG. 1, the pair of interconnect units 25e, 25f, and the pair 25c, 25d may be inserted in the other diametrical slots 31b, 31c. Thereafter, the sleeve element 10 may be positioned over inner member 20 so that the free ends of the interconnect flat springs will be received in slots 13, 15 of sleeve element 10. Then, interconnect units 25a, 25b may be inserted in slot 31a of inner member 20 in such a manner that the free ends of the flat springs are received in slots 11, 12 of sleeve element 10. Each of the springs is secured in the various slots of sleeve element 10 by any suitable means such as welding. Thus, inner member 20 and sleeve element 10 are structurally connected one to another by means of interconnect units 25a to 25f.

Turning now to FIG. 2, the cooperation of the various parts, when assembled, is clearly shown. The view is a cross-section through the assembled flexural pivot taken through one of the diametrical slots or passageways of inner member 20 and adjacent to one of the interconnect units. As heretofore explained, a diametrical slot 31 is formed through the inner member 20 leaving wall portions 33a, 33b, as the sidewalls of the slot 31. The slot is further characterized by removing a portion of the sidewall at each end of the slot so as to leave a recessed flat portion 34 at either end of the slot. As will be noted this flat portion 34, at one end of the slot, serves as a shoulder which is engaged by a flange on interconnect unit 25. The outer portion of the interconnect unit 25 may therefore be contoured to the cylindrical shape of inner member 20. And as heretofore explained one end edge of spring 28 is secured, as by welding, within the longitudinal slot of interconnect unit 25. The other end of spring 28 is secured within a longitudinal slot of sleeve unit 10. As sleeve unit 10 is rotated with respect to inner member 20, spring 28 bends or flexes along the contoured surfaces 27 of the longitudinal slot of interconnect unit 25. There are little or no bending stresses induced in the joint between spring 28 and the body 26 of interconnect unit 25 since the shape permitted to be assumed by spring 28 in bending is restricted and defined by the contour of walls 27.

Figure 3:
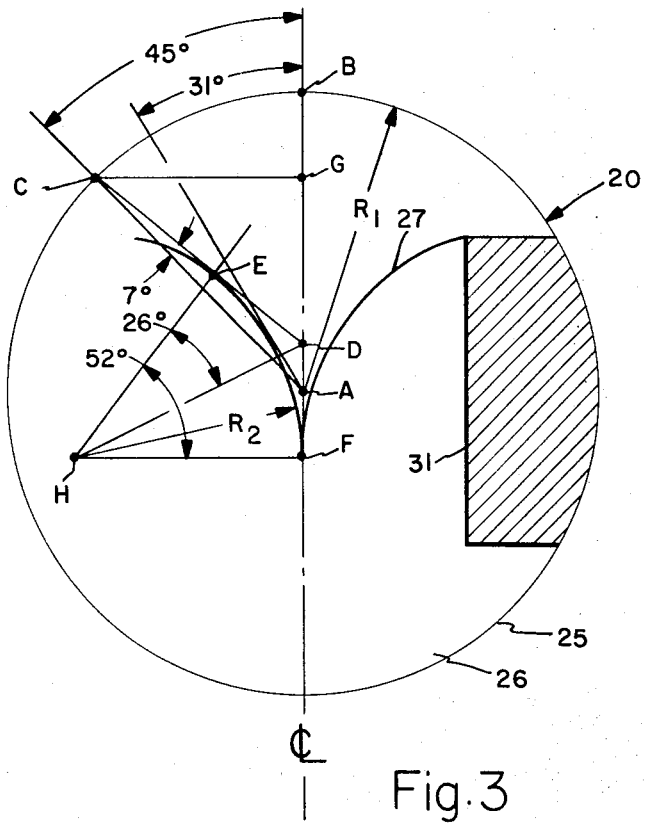
FIG. 3 shows the relation between the spring element and the cam surfaces of FIG. 2 and will be used in analyzing design calculations.

By way of further explanation, certain design criteria and calculations will now be discussed with reference to FIG. 3. It is here assumed that a flexural pivot of the type herein described is to be constructed having an inner member radius of $R_1$, a maximum relative rotation between inner member 20 and sleeve 10 of 45° and that flexure of the junction of the flat spring 28 and outer member 10 shall not exceed 7°. In FIG. 3, inner member 20 and interconnect unit 25 is shown in partial cross-section. Interconnect body 26 extends into diametrical slot 31 of inner member 20. Surface 27 of body 26 forms one wall of the elongated slot which serves to confine the flat spring to a prescribed shape of bending.

As shown in FIG. 3, point A represents the center of radius for the assembly consisting of inner member 20 and interconnect unit 25. The line AB is the equivalent of the radius $R_1$. Point C is the maximum deflection position as determined by the 45° maximum relative rotation between the inner member 20 and sleeve 10. Point D on line AB is determined by the 7° angle of flexure permitted at the junction of the flat spring and the sleeve element.

It is readily clear that the flat spring 28 must bend along a path of constant curvature and that this path must be tangent to the vertical centerline FADGB and to the line CED. Thus, the radius of curvature of the flat spring 28 will be perpendicular to lines CED and FADGB. These tangent points are labled E and F. Radii to these points intersect at H. By geometry, the angle included within the lines EHF is 52° and that within EHD equals that within DHF and each equals 26°. Assigning the value of unity to the radius $R_1$, the radius of curvature $R_2$ to contoured surface 27 may be obtained as follows:

$AC = AB = R_1 =$ unity
$(ARC\ FE) + EC = FA + R_1$
(Equation 1)
$FD = DE = R_2\ TAN\ 26°$
$DG = (R_1\ COS\ 45°)\ TAN\ 38°$
$GB = R_1 - R_1\ COS\ 45°$
$FA = FD + DG + GB - R_1$
$FA = (R_2\ TAN\ 26°) + (R_1 COS\ 45°\ TAN\ 38°) + (R_1 - R_1\ COS\ 45°) - R_1$
$DC = (R_1 COS\ 45°)/COS\ 38° = R_1\ COS\ 45°\ SEC\ 38°$
$EC = DC - DE = DC - FD$
$EC = (R_1 COS\ 45\ SEC\ 38) - (R_2\ TAN\ 26)$
$ARC\ FE = R_2\ (.90757);\ 52° = .90757$ radians Substituting in Equation 1

$R_2\ (.90757) + (COS\ 45°\ SEC\ 38° - R_2\ TAN\ 26°) = (R_2\ TAN\ 26° + COS\ 45°\ TAN\ 38 + 1 - COS\ 45) - R_1 + R_1$
$R_2 = .765$

Although the foregoing calculation steps have been presented in reduced form, it may be seen that all dimensions necessary for constructing the flexural pivot of the present invention may be readily derived.

Figure 4:
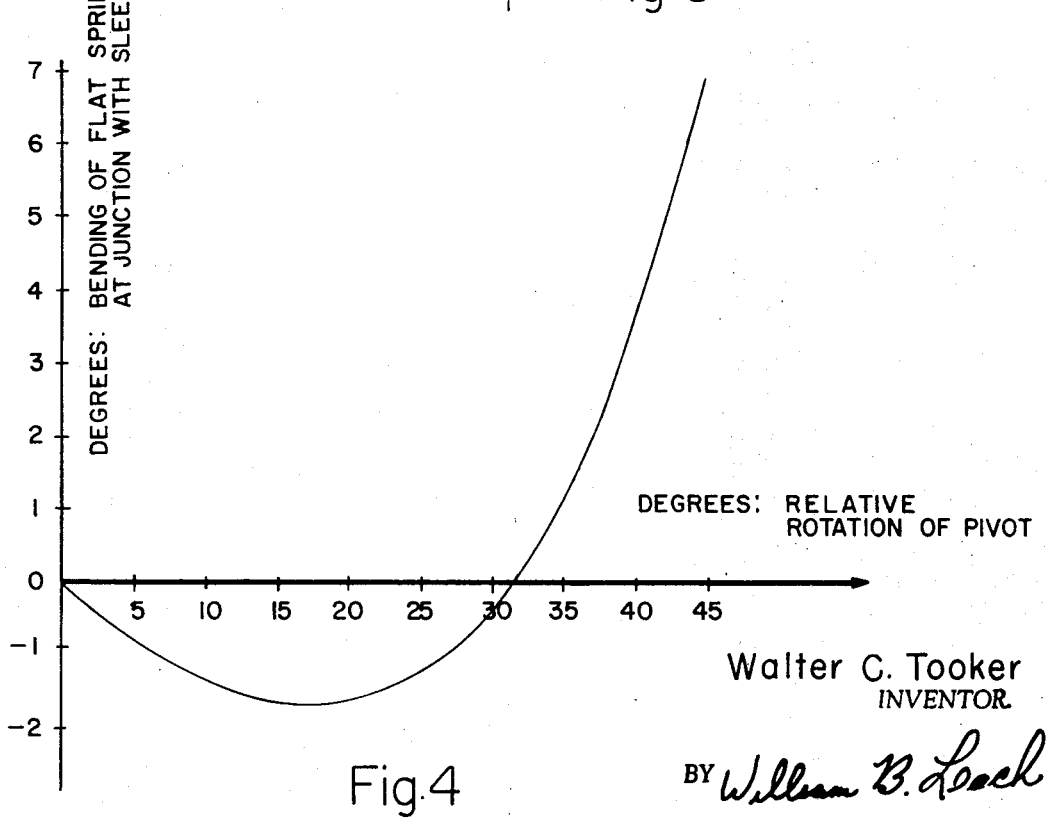
FIG. 4 is a graphical representation of the bending characteristics of the spring of FIG. 2.

In FIG. 4, a typical plot of bending is graphically shown for the flexure pivot of FIG. 3. The Y-axis represents bending of the flat spring measured from the perpendicular to sleeve member 10. Pivotal deflection, or relative rotation between inner member 20 and sleeve member 10 is measured from the non-deflected position of the spring 28. Pivotal rotation may be either plus or minus. The X-axis represents the pivotal deflection. From FIGS. 3 and 4 it may be seen that there is no junction bending when the pivotal deflection is zero or 31 degrees. As further seen from FIG. 4, the pivot can turn in excess of 35 degrees before bending of the flat spring at the attachment point on the sleeve 10 is more than two degrees.

There has thus been described a flexural pivot capable of relative large angular excursions and long life. By reducing the angle of bending at the attachment points to the inner member and sleeve member, fatigue and resultant failure of the flat spring is reduced. The cam surfaces shown in the drawings and described above are portions of a cylindrical body. The geometry was selected for its ease of manufacturing and close approximation of that shape which minimizes the bending stresses in the spring member. An involute cam surface would optimize the stress conditions in the spring. An involute surface, however, is not desirable from a production standpoint.

I claim:
1. A mounting device comprising:
   (a) an inner member;
   (b) a sleeve element substantially encasing said inner member;
   (c) an elongated resilient member having one end attached to said sleeve and the other end attached to said inner member, said inner member being thereby spaced from said sleeve; and
   (d) a cam having an arcuate surface, said cam being joined to said inner member and its arcuate surface tangent to said elongated resilient member, the arcuate surface of said cam being positioned to limit said elongated resilient member in flexure, whereby torsional motion may be imparted to said sleeve and said inner member until limiting abutting engagement of said elongated resilient member occurs with the arcuate surface of said cam.
2. A flexural pivot comprising:
   (a) an inner elongated member having slots formed therein, said slots extending substantially transversely there through, and being shaped to define facing arcuate surfaces converging from the mouth of the slot toward the base thereof;
   (b) an outer element positioned radially outwardly from said slot of said inner member; and
   (c) a flexible member interconnecting said outer element and the base of the slot of said inner member, the converging arcuate surfaces of said slot serving to limit the travel of said flexible member in flexure.
3. A flexural pivot comprising:
   (a) a cylindrical sleeve;
   (b) a shaft extending within and radially spaced from said cylindrical sleeve, said shaft having at least one slot extending diametrically therethrough;
   (c) a first pair of cams securedly inserted in said slot in juxaposition, the adjacent surfaces of said cams being arcuate and converging radially inwardly; and
   (d) a flat spring positioned intermediate the arcuate cam surfaces and having one end edge connected to both of said cams at the radially inwardly convergent portion of said cams, said spring extending inwardly through said slot intermediate the arcuate cam surfaces and having the other end edge connected to said cylindrical sleeve, whereby relative rotational motion may exist between said cylindrical sleeve and said shaft.
4. In a flexural pivot of the type which includes a pair of flat, crossed springs interconnecting inner and outer members for permitting a limited degree of rotational movement therebetween, the improvement comprising:
   (a) the inner member being characterized by a pair of transverse passageways therethrough, and further comprising:
   (b) a pair of body members each insertable into one of said passageways of the inner member, each said body having a slot therein of arcuate sidewalls and adapted to serve as an attachment for one edge of one of the flat springs, said one spring extending outwardly of said slot to attachment with the outer member thereby interconnecting the inner and outer members, said arcuate sidewalls of each said slot serving to define a path of bending for the spring associated therewith; and
   (c) means securing each of the springs within the slot of one of said pair of body members.
5. The flexural pivot of claim 4 wherein said arcuate surface is a portion of a cylinder.
6. The flexural pivot of claim 4 wherein said arcuate surface is involute.

References Cited
UNITED STATES PATENTS

| | | | |
|---|---|---|---|
| 2,814,187 | 11/1957 | Babaian | 64—15 |
| 2,872,225 | 2/1959 | Walker | 64—11 XR |
| 3,073,584 | 1/1963 | Troeger | 64—27 XR |
| 3,290,949 | 12/1966 | Samet | 74—5 |
| 3,312,458 | 4/1967 | Bratt | 64—15 XR |
| 3,363,435 | 1/1968 | Crow | 64—27 |
| 3,413,858 | 12/1968 | Samet | 74—5 |

MANUEL A. ANTONAKAS, Primary Examiner

U.S. Cl. X.R.

64—15; 74—5